United States Patent
Wittig et al.

(10) Patent No.: US 6,697,225 B2
(45) Date of Patent: Feb. 24, 2004

(54) DAMPER FOR ATTENUATING HARD DISK DRIVE SUSPENSION VIBRATION

(75) Inventors: Larry E. Wittig, Lexington, MA (US); Stanislaw Dobosz, Shrewsbury, MA (US)

(73) Assignee: Maxtor Corporation, Longmont, CO (US)

( * ) Notice: Subject to any disclaimer, the term of this patent is extended or adjusted under 35 U.S.C. 154(b) by 355 days.

(21) Appl. No.: 09/822,788

(22) Filed: Mar. 30, 2001

(65) Prior Publication Data

US 2002/0141114 A1 Oct. 3, 2002

(51) Int. Cl.[7] .............................................. G11B 21/16
(52) U.S. Cl. .................................................... 360/244.9
(58) Field of Search ...................................... 360/244.9

(56) References Cited

U.S. PATENT DOCUMENTS

| 4,189,759 | A | * | 2/1980 | Bauck et al. | ............ | 360/244.9 |
| 5,771,135 | A | * | 6/1998 | Ruiz et al. | ............... | 360/244.3 |
| 5,940,251 | A | * | 8/1999 | Giere et al. | .............. | 360/244.9 |
| 5,949,617 | A | * | 9/1999 | Zhu | ........................ | 360/244.8 |
| 6,504,684 | B1 | * | 1/2003 | Danielson et al. | ....... | 360/244.8 |

FOREIGN PATENT DOCUMENTS

| JP | 01248372 A | * | 10/1989 | ........... G11B/21/21 |
| JP | 04079085 A | * | 3/1992 | ........... G11B/21/21 |

* cited by examiner

*Primary Examiner*—David Davis
(74) *Attorney, Agent, or Firm*—James P. Broder; Steven G. Roeder (57) ABSTRACT

A suspension assembly (24) for a storage device (10) that includes a load beam (52) and a damper assembly (54). The load beam (52) couples a data transducer (22) to an actuator arm (40). The damper assembly (54) is secured to the load beam (52). The damper assembly (54) includes a damper beam section (72) and a damper mass section (74). The damper beam section (72) cantilevers from the load beam (52). The damper mass section (74) is secured the damper beam section (72). The damper assembly (54) also includes a resilient layer (88) and a cover layer (90). The resilient layer (88) extends between the damper mass section (74) and the load beam (52). The cover layer (90) covers the resilient layer (88). During rotation of a storage disk (30), the load beam (52) has a load beam resonance frequency. The damper assembly (54) has a damper resonance frequency that is tuned to be similar to the load beam resonance frequency to decrease off-track movements of the data transducer (22) relative to the storage disk (30).

28 Claims, 5 Drawing Sheets

DAMPER FOR ATTENUATING HARD DISK DRIVE SUSPENSION VIBRATION

FIELD OF THE INVENTION

The present invention relates generally to disk drives for storing and retrieving data. More specifically, the present invention relates to a suspension assembly for a storage device that minimizes the amplitude of the sway mode of the suspension assembly and decreases track misregistration.

BACKGROUND

Disk drives are widely used in computers and data processing systems for storing information in digital form. These disk drives commonly use one or more rotating storage disks to store data. Each storage disk typically includes a data storage surface on each side of the storage disk. These storage surfaces are divided into a plurality of narrow, annular regions of different radii, commonly referred to as "tracks". Typically, a head stack assembly having a positioner, an E-block, and a suspension assembly is used to position a data transducer proximate each data storage surface of each storage disk. The data transducer transfers information to and from the storage disk when positioned on the appropriate track of the storage surface. A control system directs current to the positioner to adjust the position of the E-block and suspension assembly relative to the storage disks.

The need for increased storage capacity and compact construction of the disk drive has led to the use of disks having increased track density or decreased track pitch, i.e., more tracks per inch. As the tracks per inch increase, the ability to maintain the data transducer on a target track becomes more difficult. More specifically, as track density increases, it is necessary to reduce positioning error of the data transducer proportionally. Stated another way, with these systems, the accurate and stable positioning of the data transducer is critical to the accurate transfer and/or retrieval of information from the rotating storage disks.

Moreover, because modern disk drives may operate at 10,000 revolutions per minute or higher, aerodynamic forces act on the E-block and the suspension assembly, making it increasingly difficult to maintain the data transducer on a particular track of a rotating storage disk. Stated another way, high-speed disk drives generate substantial internal turbulence and vibration. Thus, the ability to avoid track misregistration has become more difficult.

Vibrations of the E-block and suspension assembly are generally caused by a forcing function of the feedback of the control system, and by forces external to the control system. At frequencies below the bandwidth of the positioner, the control system can correct both types of vibrations. However, the control system cannot correct for vibrations caused by external forces at frequencies that are above the bandwidth of the positioner.

One attempt to improve positioning accuracy includes the use of notch filters in the servo controller. The notch filters effectively reduce the vibration amplitudes for feedback force disturbances at frequencies above the bandwidth of the positioner. However, notch filters cannot be used to reduce the response amplitude for disturbances external to the control loop. For example, and in particular, notch filters cannot correct aerodynamic excitation of a sway mode of the suspension assembly. Unfortunately, the response to aerodynamic forces at the suspension sway mode alone may be more than a high track density drive can tolerate.

In light of the above, there is a need for a device that substantially reduces the vibration amplitude of the suspension assembly of a storage device. Additionally, there is a need for a head stack assembly that accurately positions the data transducers and decreases track misregistration. Moreover, there is a need for a high-density, high-speed disk drive that can be manufactured relatively inexpensively.

SUMMARY

The present invention is directed to a suspension assembly for suspending a data transducer of a storage device. The storage device includes at least one rotatable storage disk and at least one actuator arm. The data transducer accesses and/or transfers information from the storage disk. The suspension assembly couples one data transducer to one actuator arm. Each suspension assembly includes a load beam, a gimbal assembly and a slider. The load beam supports the data transducer near the storage disk.

The suspension assembly has several vibration resonances including bending, torsion and sway. Present design practices can be used to reduce the vibration amplitude at the bending and torsion modes, but there are not present design practices to reduce the amplitude of the sway mode. Uniquely, the damper assembly described herein is designed to reduce the vibration amplitude of the sway mode.

As a result of this damper assembly design, the load beam resonance amplitude is reduced, thereby decreasing off-track movements of the data transducer relative to the storage disk. Moreover, as a result of this design, the accuracy of data transducer positioning can be increased. Additionally, storage disks with increased tracks per inch may be utilized due to the more accurate data transducer positioning. Further, disk drives with higher disk rotation speeds can be utilized.

As provided herein, the damper assembly is part of the load beam. The damper assembly includes a damper beam section and a damper mass section. The damper beam section preferably cantilevers from the load beam proximate the data transducer. The damper mass section is secured to the damper beam section. Preferably, the load beam, the damper beam section and the damper mass section are formed as a one-piece unitary structure. Further, the damper assembly includes a resilient layer and a cover layer. The resilient layer extends between the damper mass section and the load beam. The cover layer covers the resilient layer.

The present invention is also directed to a disk drive and a method for damping vibration of the suspension assembly of a disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
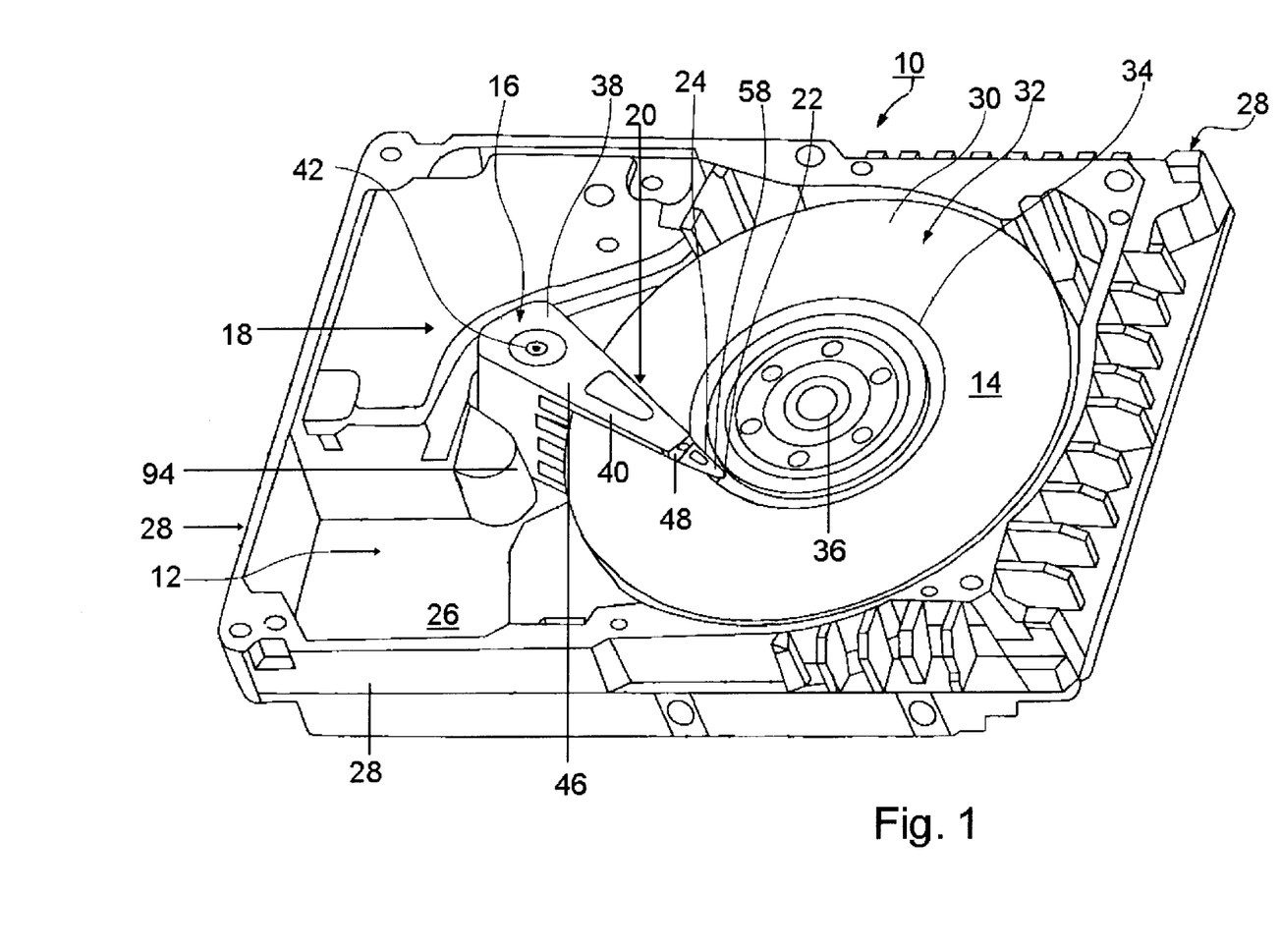
FIG. 1 is a perspective view of a disk drive having features of the present invention.

Referring initially to FIG. 1, a disk drive 10 according to the present invention includes (i) a drive housing 12, (ii) a disk assembly 14, and (iii) a head stack assembly 16 including a positioner 18 (e.g. a voice coil motor), an E-block 20, one or more data transducers 22, and a suspension assembly 24. The suspension assembly 24 is uniquely designed to minimize the amplitude of the "suspension sway mode". As a result thereof, the head stack assembly 16 can accurately position the data transducer 22.

A detailed description of the various components of a disk drive is provided in U.S. Pat. No. 5,208,712, issued to Hatch et al. The contents of U.S. Pat. No. 5,208,712 are incorporated herein by reference.

The drive housing 12 retains the various components of the disk drive 10. The drive housing 12, illustrated in FIG. 1, includes a base 26 and four (4) side walls 28. A typical drive housing 12 also includes a cover (not shown) that is spaced apart from the base 26 by the side walls 28. The drive housing 12 is typically installed in the case of a computer (not shown) or a disk drive array (not shown).

The disk assembly 14 includes one or more storage disks 30 that store data in a form that can be subsequently retrieved if necessary. For conservation of space, each storage disk 30 preferably includes a data storage surface 32 on each side of the storage disk 30. These storage surfaces 32 are typically divided into a plurality of narrow annular regions of different radii, commonly referred to as "tracks." The suspension assembly 24 provided herein allows for the use of storage disks 30 having higher track densities. The storage disks 30 are manufactured by ways known to those skilled in the art.

A target track 34 that contains the desired data (not shown) is illustrated in FIG. 1 on the top storage surface 32 on the top storage disk 30. It should be noted that the target track 34 illustrated in FIG. 1 is for reference and that any of the tracks on any of the storage disks 30 can be the designated target track 34.

Depending upon the design of the disk drive 10, any number of storage disks 30 can be used with the disk drive 10. For example, the disk drive 10 can include from one to twelve or more storage disks 30. For two-sided storage disks 30, the disks 30 are spaced apart a sufficient distance so that at least one (1) data transducer 22 can be positioned proximate each of the storage surfaces 32 of adjacent storage disks 30. To conserve space, a centerline (not shown) of consecutive disks 30 is typically spaced apart between about two millimeters (2.0 mm) to four millimeters (4.0 mm).

The storage disks 30 are mounted on a disk spindle 36 that is mounted to a spindle shaft (not shown). The spindle shaft is secured to the base 26. The disk spindle 36 rotates on a disk axis (not shown) relative to the spindle shaft on a spindle bearing assembly (not shown). Typically, the disk spindle 36 and the storage disks 30 are rotated about the disk axis at a predetermined angular velocity by a spindle motor (not shown). The rotation rate of the storage disks 30 varies according to the design of the disk drive 10. However, rotation rates exceeding ten thousand revolutions per minute (10,000 rpm) are not uncommon.

As provided above, the head stack assembly 16 includes the positioner 18, the E-block 20, one or more data transducers 22, and one or more suspension assemblies 24. The positioner 18 moves and positions the E-block 20 and the data transducer 22 relative to the storage disks 30. The positioner 18 can be configured and manufactured in various ways known to those skilled in the art. For example, the positioner 18 can rotate the E-block 20 or move the E-block 20 linearly. In the embodiment of FIG. 1, the positioner 18 rotates the E-block 20. In this embodiment, the positioner 18 includes a pair of spaced apart magnets (not shown) and a conductor assembly (not shown). The conductor assembly can include a conductor housing (not shown) and one or more conductor arrays (not shown). The conductor housing typically secures the conductor array to the E-block 20. The conductor array interacts with the magnets to move the E-block 20 and each data transducer 22 relative to the storage disks 30.

As can best be seen with reference to FIG. 1, the E-block 20 includes an actuator hub 38 and a plurality of parallel actuator arms 40 that are attached to and cantilever from the actuator hub 38. In the embodiment illustrated in FIG. 1, the actuator hub 38 is substantially tubular and is mounted to an actuator shaft 42 on an actuator bearing assembly (not shown). Importantly, however, the present invention may also be used in storage devices that utilize positioners other than rotary actuators.

The actuator arms 40 move with the actuator hub 38 and position the data transducers 22, proximate the to data storage surfaces 32. Each actuator arm 40 includes an arm proximal section 46 that is secured to the actuator hub 38 and an arm distal section 48 that cantilevers away from the actuator hub 38. The spacing of the actuator arms 40 varies according to the spacing of the storage disks 30. The distance between consecutive actuator arms 40 is typically between about two millimeters (2 mm) to four millimeters (4 mm).

The data transducers 22 transfer or transmit information between the computer (not shown) or disk drive array (not shown) and the storage disks 30. Each data transducer 22 interacts with one (1) of the storage disks 30 to access or transfer information to the storage disk 30. For a magnetic storage disk 30, as an example, the data transducer 22 is commonly referred to as a read/write head.

Each suspension assembly 24 couples each data transducer 22 to one of the actuator arms 40 of the E-block 20. Typically, one or two suspension assemblies 24 are secured to each actuator arm 40, depending on the relative positioning of the actuator arm 40 to the storage disks 30. For instance, if the actuator arm 40 extends between two storage disks 30, usually two suspension assemblies 24 will be secured to the actuator arm 40. On the other hand, if the actuator arm 40 is positioned only above or below a storage disk 30, normally one suspension assembly 24 will be secured to the actuator arm 40. Stated another way, the number of suspension assemblies is typically equal to the number of storage surfaces 32.

Figure 2:
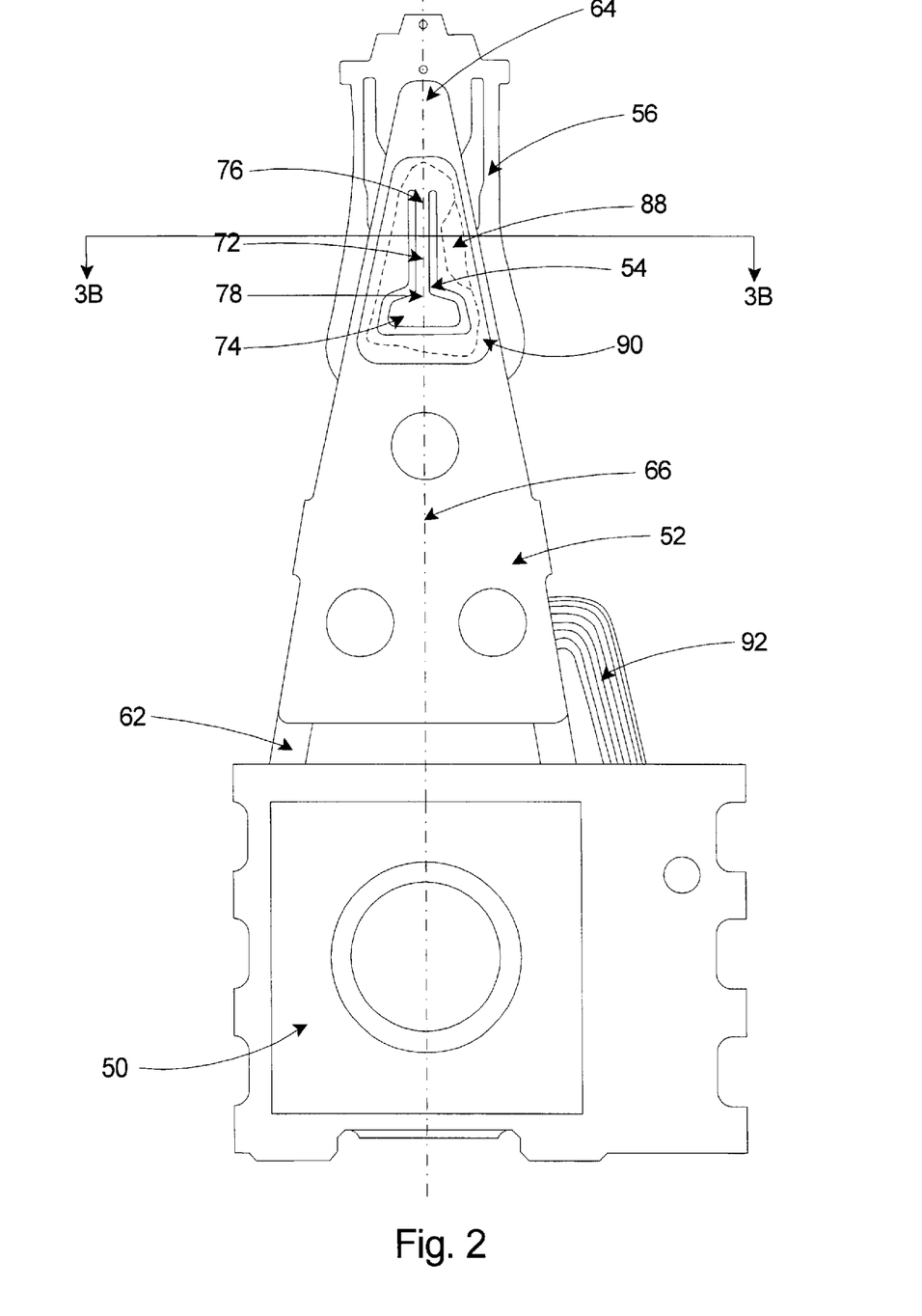
FIG. 2 is a top view in partial cut-away of a suspension assembly having features of the present invention.

Each suspension assembly 24 includes a base plate 50, a load beam 52, a damper assembly 54, a flexure 56 and a slider 58. Referring to FIG. 2, the base plate 50 couples the load beam 52 to the actuator arm 40 of the E-block 20. The load beam 52 includes a beam body that secures the flexure 56, the slider 58, and the data transducer 22 to the actuator arm 40. The load beam 52 is typically designed to be flexible in a direction perpendicular to the storage disk 30. Thus, the load beam 52 acts as a spring for supporting and maintaining the slider 58 and the data transducer 22 at a given height above the rotating storage disk 30.

Unfortunately, the load beam 52 also flexes laterally at a "load beam sway mode resonance frequency" as the result of aerodynamic forces caused by rotating storage disks 30. More specifically, the rotation of the storage disks 30 in a high-speed disk drive 10 generates internal air turbulence. This causes unwanted movement of the suspension assembly 24, known in the art as "suspension sway mode". The suspension sway mode of the load beam 52 can result in track misregistration. Stated another way, the suspension sway mode of the load beam 52 inhibits the positioner 18 from accurately positioning each data transducer 22 relative to the storage disks 30.

As provided herein, the load beam 52 includes a beam proximal end 62 and a beam distal end 64. The beam proximal end 62 is secured to the actuator arm 40 with the base plate 50 while the data transducer 22 is positioned near the beam distal end 64. Additionally, the load beam 52 has a longitudinal axis 66 as depicted in FIG. 2. The load beam 52 has a first beam surface 68 that is oriented to face the storage disk 30 that is adjacent to the load beam 52. The load beam 52 also has a second beam surface 70 that is opposite the first beam surface 68.

Figure 3A:
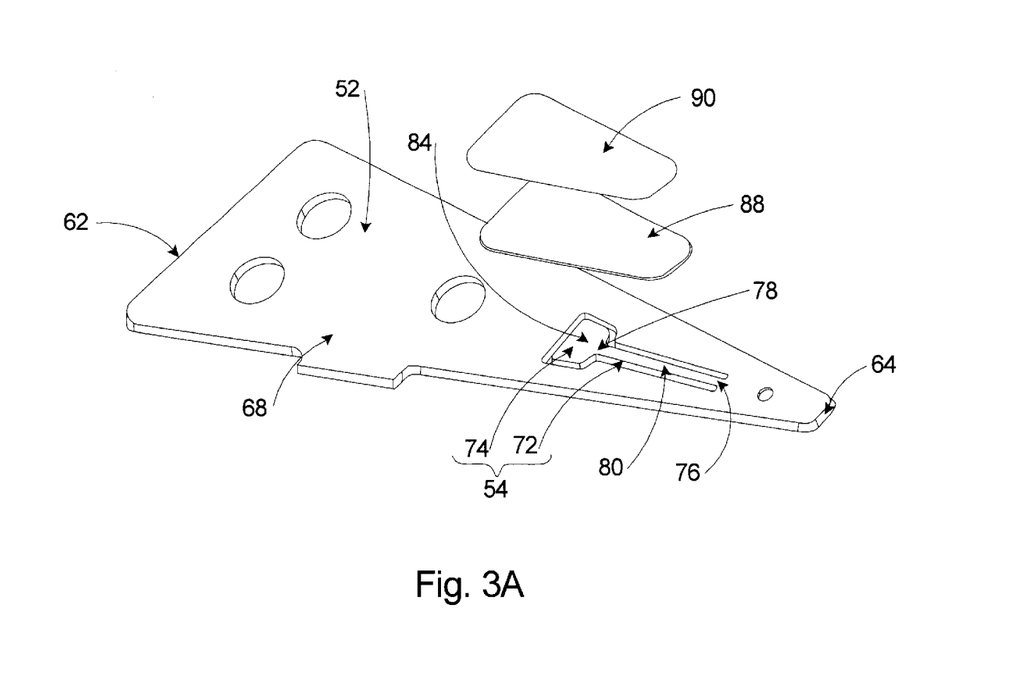
FIG. 3A is an exploded perspective view of a portion of the suspension assembly.
Figure 3B:
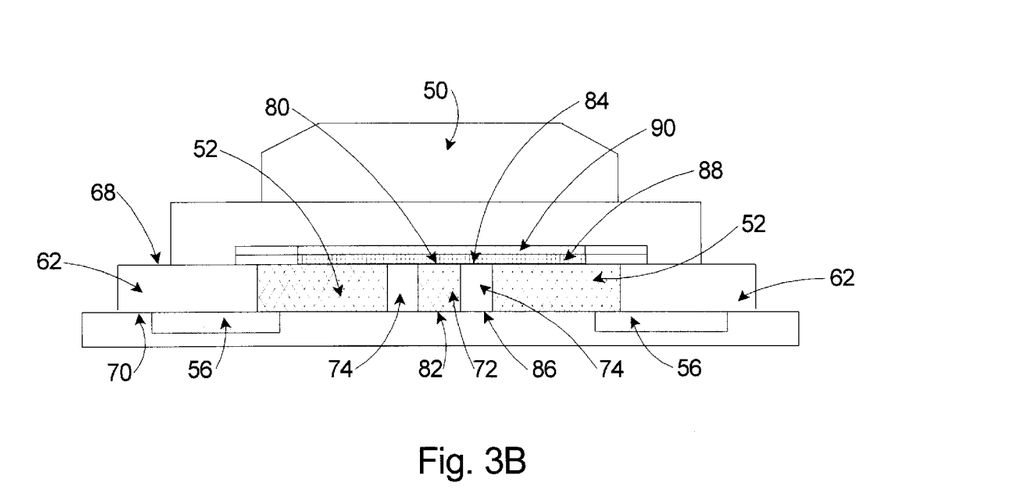
FIG. 3B is a cross-sectional view taken on Line 3B—3B in FIG. 2.

The damper assembly 54 counteracts the lateral movements of the load beam 52. Stated another way, the damper assembly 54 has a damper resonance frequency that is similar to the load beam sway mode resonance frequency. Preferably, the damper resonance frequency is within at least approximately twenty percent and even more preferably at least approximately ten percent of the load beam sway mode resonance frequency. With this design, the damper assembly 54 reduces the amplitude of the suspension sway mode. In the embodiments illustrated herein, the damper assembly 54 is secured to the load beam 52. Referring to FIGS. 2, 3A and 3B, the damper assembly 54 includes a damper beam section 72 and a damper mass section 74. The damper beam section 72 has a proximal beam end 76 and a distal mass end 78. The proximal beam end 76 is secured to the load beam 52. The damper beam section 72 can, for example, cantilever from the load beam 52 in a direction that is substantially parallel to the longitudinal axis 66 of the load beam 52. Preferably, the damper beam section 72 is positioned so that the damper beam section 72 cantilevers from the load beam 52 near the beam distal end 64 and where the data transducer 22 is secured to the load beam 52. As shown in FIGS. 3A and 3B, the damper beam section 72 has a first beam surface 80 and a second beam surface 82 that correspond to the first and second load beam surfaces 68, 70, respectively.

The damper mass section 74 is secured to the distal mass end 78 of the damper beam section 72. The damper mass section 74 has a first mass surface 84 and a second mass surface 86 that correspond to the first and second beam surfaces 80, 82, respectively. The size and shape of the damper mass section 74 and the damper beam section 72 can be varied to adjust the damper resonance frequency and reduce the suspension sway mode.

The load beam 52, the damper beam section 72, and the damper mass section 74 are preferably formed as a unitary structure, but may also be separately formed structures that are secured together. The load beam 52, the damper beam section 72 and the damper mass section 74 are usually formed from metallic materials such as stainless steel, although other suitable composites may be used.

In one embodiment of the invention, the damper assembly 54 also includes a resilient layer 88 and a cover layer 90 (illustrated in partial cut-away in FIG. 2). The resilient layer 88 allows lateral movement of the damper beam section 72 and the damper mass section 74 at a "damper resonance frequency", while minimizing movement of the damper beam section 72 and the damper mass section 74 in a direction perpendicular to the storage disk 30. The resilient layer 88 is typically comprised of a resilient visco-elastic material, although other appropriate resilient materials can be utilized. The resilient layer 88 bonds to the first mass surface 84 and adjacent sections of the first load beam surface 68, and can also be bonded to the first beam surface 80. The composition and thickness of the resilient layer 88 can also be varied to adjust the damper resonance frequency to reduce the suspension sway mode.

The cover layer 90 covers the resilient layer 88. The function of the cover layer 90 is to increase shear stress in the resilient layer 88 to increase vibration energy absorbed by the damper assembly 54. The cover layer 90 is comprised of a plastic material such as Kapton or Mylar, although other suitable materials can be utilized. The cover layer 90 is typically less resilient and more rigid than the resilient layer 88.

As illustrated in FIG. 1, the flexure 56 secures the slider 58 to the load beam 52. The slider 58 carries the data transducer 22. Typically, each flexure 56 includes a plurality of conductive flexure traces 92 that are electrically connected to the data transducer 22. Each flexure trace 92 is subsequently attached to a flex circuit 94 that electrically connects the flexure traces 92 to the disk drive 10.

Figure 4:
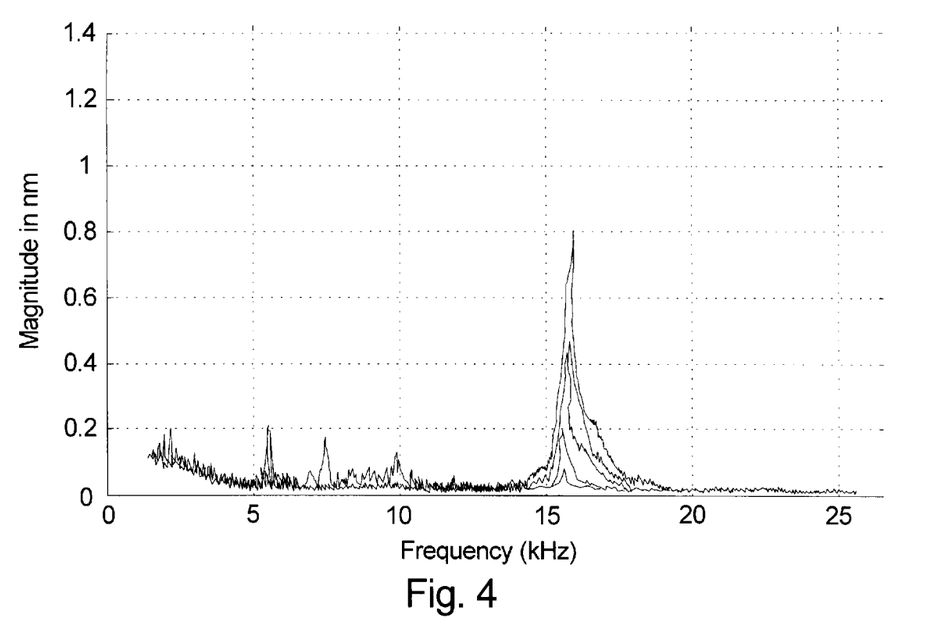
FIG. 4 is a graph of magnitude versus frequency showing lateral off-track displacement of a data transducer due to aerodynamic forces for several track locations.

FIG. 4 illustrates lateral off-track response of the suspension sway mode measured on a spin stand with a Laser Doppler Vibrometer (not shown). The horizontal axis represents frequency and the vertical axis represents lateral off-track displacement of the data transducer 22 in nanometers. Lateral off-track displacement was measured from different stroke locations on the storage disk 30, as represented by multiple plots on FIG. 4. A peak in the spectrum occurs at approximately 16 kilo-hertz ($1.6 \times 10^4$ Hz), and is due to aerodynamic excitation of the suspension sway mode. In this case the track misregistration caused by the aerodynamic forces at the suspension sway mode alone, even when discounting all other sources of track misregistration, may be more than a high track density disk drive 10 can tolerate.

Figure 5:
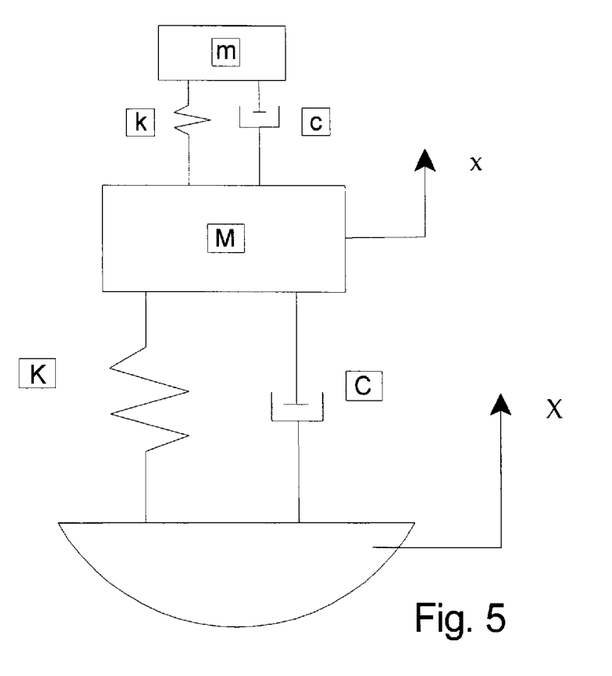
FIG. 5 is a lumped element model of a suspension assembly having features of the present invention.

A schematic of a damper assembly 54 is represented by the m-c-k system in FIG. 5. A baseline suspension sway mode which is sought to be damped is represented by mass M, damping constant C, and spring constant K that are excited by base excitation X. The baseline case is simulated by setting m<<M and C<<Sqrt (KM).

Figure 6:
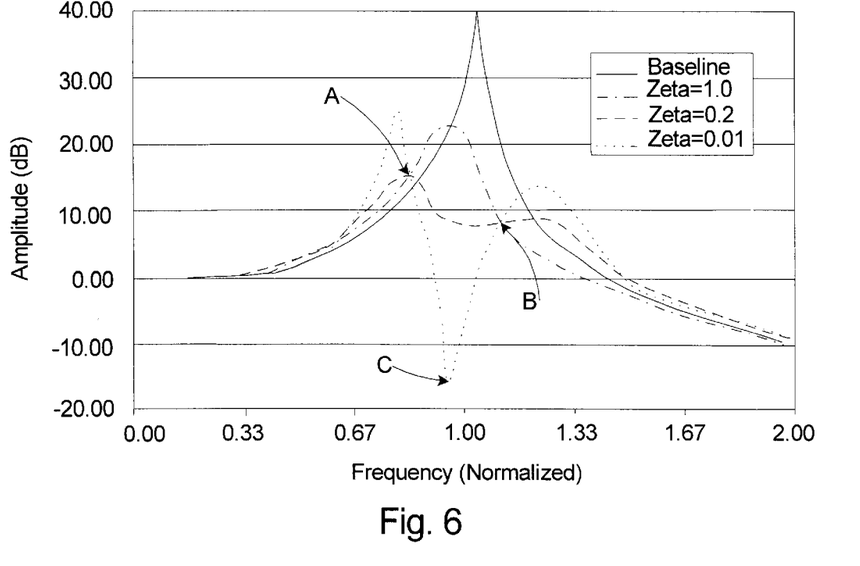
FIG. 6 is a graph that illustrates the anticipated sway mode of the suspension assembly with a damper assembly of the present invention and without a damper assembly.

FIG. 6 illustrates the displacement response x of the mass M for the baseline case, normalized by base excitation X, as shown by the solid line on the graph. 20Log(x/X) is plotted on the vertical scale versus frequency of the load beam 52 on the horizontal axis normalized to the natural load beam 52 frequency of the baseline system without the present invention.

FIG. 6 also shows cases where the present invention is included for values of a damping ratio $\zeta = c/\{2[\text{Sqrt}(km)]\} = 0.01$, 0.2 and 1.0. All curves pass substantially through points A and B. The optimum design for excitation at a single frequency, near the natural frequency of the baseline system, has very light damping (i.e. $\zeta \leq 0.01$) represented by point C. However, the optimum damping for broadband excitation is when the curve passes through A and B nearly horizontally and points A and B have substantially the same amplitude. The dashed curve of FIG. 6 comes closest to the optimum scenario. Because aerodynamic forces in a disk drive 10 are broadband, the results of the dashed curve are closest to the goal for damping the suspension sway mode of the load beam 52.

FIG. 6 further shows that if the damping is too light, the curve will have two peaks (dotted curve). On the other hand, if the damping is too heavy, only a single peak will result (dash-dot curve). There exists, however, a reasonably broad range of damping, from approximately $\zeta=0.1$ to $\zeta=0.3$ that gives a reasonably minimal area under the curve, such as the preferred $\zeta=0.2$ (dashed curve). A broad range of damping is critical, because damping materials are typically temperature sensitive. Thus, the broad range of damping provided by the present invention is effective over a range of temperatures.

Figure 7:
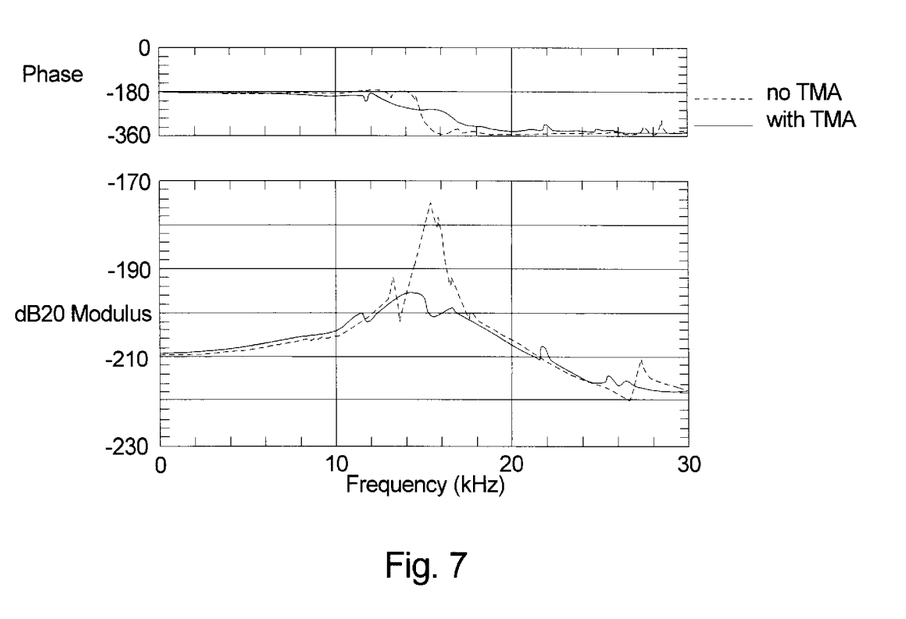
FIG. 7 is a graph that illustrates predicted reduction in sway mode vibration utilizing the damper assembly at 50° C.: (a) dashed curve—amplitude without the damper assembly, (b) solid curve—amplitude with the damper assembly.

FIG. 7 shows the result of a Finite Element Method (FEM) analysis of the damper assembly. The suspension and the damper parts were modeled in detail, and the analysis was done with and without the damper assembly absorber. The input to the model was a lateral vibration at the swage plate end of the suspension over a range of frequencies, and the output is the vibration amplitude at the recording element. In FIG. 7 this ratio is plotted on logarithmic scale labeled "dB20 Modulus". From the computed strain energy in the resilient layer and that in the remainder of the suspension, and from the properties of the resilient layer (in this case at 50° C.), the total damping for the sway mode was computed. The case with no damper assembly was calculated using experimentally measured damping. FIG. 7 shows that for this case the sway mode amplitude was reduced by approximately 20 dB (a factor of ten).

To implement the present invention in a given suspension assembly 24, the damper mass section 74, the stiffness of the damper beam section 72, and the thickness of the cover layer 90 are all tuned to achieve a result similar to that achieved by the optimum damping depicted in FIG. 6, discussed above. It should be noted that the example illustrated in FIG. 6 applies the present invention to one possible suspension assembly 24, and is intended only as a representative case. Many other similar scenarios are possible, and the above example is not intended to limit application of the present invention in any manner.

While the particular suspension assembly 24 and disk drive 10 as herein shown and disclosed in detail are fully capable of attaining the objectives and providing the advantages herein before stated, it is to be understood that it is merely illustrative of the presently preferred embodiments of the invention and that no limitations are intended to the details of construction or design herein shown other than as described in the appended claims.

What is claimed is:

1. A suspension assembly for suspending a data transducer of a storage device, the storage device including (i) an actuator arm, and (ii) a rotating storage disk, the suspension assembly comprising:
   a load beam that couples the data transducer to the actuator arm, the load beam having a load beam resonance frequency; and
   a damper assembly including (i) a damper beam section coupled to the load beam, (ii) a damper mass section coupled to the damper beam section, and (iii) a resilient layer that extends between the damper mass section and the load beam, the damper assembly having a damper resonance frequency that is similar to at least one of the load beam resonance frequencies.

2. The suspension assembly of claim 1 further including a cover layer that covers at least a portion of the resilient layer.

3. A disk drive including the suspension assembly of claim 1 and a storage disk positioned near the suspension assembly.

4. A suspension assembly for suspending a data transducer of a storage device, the storage device including (i) an actuator arm, and (ii) a rotating storage disk, the suspension assembly comprising:
   a load beam including a beam body that extends between the actuator arm and the data transducer, a damper beam section that cantilevers away from the beam body, a damper mass section coupled to the damper beam section, and a resilient layer that extends between the damper mass section and the load beam.

5. The suspension assembly of claim 4 further including a cover layer that covers the resilient layer.

6. A disk drive including the suspension assembly of claim 4 and a storage disk.

7. A method for damping vibration of a suspension assembly that maintains a data transducer near a rotating storage disk, the method comprising the steps of:
   providing an actuator arm;
   coupling a load beam to the actuator arm, the load beam having a load beam resonance frequency, the load beam resonance frequency having an amplitude; and
   coupling a damper assembly having a damper beam section to the load beam including (i) cantilevering the damper beam section from the load beam, (ii) securing a damper mass section to the damper beam section, (iii) covering a portion of the load beam and the damper mass section with a resilient layer, and (iv) covering the resilient layer with a cover layer, the damper assembly reducing amplitude of the load beam resonance frequency.

8. A disk drive comprising:
   a storage disk;
   an actuator arm;
   a data transducer; and
   a suspension assembly for supporting the data transducer near the storage disk, the suspension assembly including (i) a flexure that supports the data transducer, (ii) a load beam that couples the flexure to the actuator arm, the load beam having a load beam resonance frequency, a proximal end and a distal end, the proximal end being secured to the actuator arm, the distal end supporting the flexure, and (iii) a damper assembly that is secured to the load beam near the flexure, the damper assembly including a damper beam section and a damper mass section that extends from the damper beam section, the damper mass section having a width that is different than a width of the damper beam section, the damper assembly reducing the amplitude of the load beam resonance frequency.

9. A disk drive comprising:
   a storage disk having a storage surface;
   an actuator arm;
   a data transducer; and
   a suspension assembly for supporting the data transducer near the storage disk, the suspension assembly including (i) a load beam that couples the data transducer to the actuator arm, the load beam having a load beam resonance frequency, and (ii) a damper assembly coupled to the load beam, the damper assembly including a damper beam section, a damper mass section that extends from the damper beam section, and a resilient layer that extends between the damper mass section and the load beam, the damper assembly reducing the amplitude of the load beam resonance frequency.

10. The disk drive of claim 9 wherein the resilient layer inhibits movement of the damper assembly in a direction that is perpendicular to the storage surface of the storage disk.

11. The disk drive of claim 9 wherein the damper assembly includes a cover layer that covers at least a portion of the resilient layer.

12. The disk drive of claim 9 wherein the damper mass section has a width that is different than a width of the damper beam section.

13. The disk drive of claim 12 wherein the width of the damper mass section is greater than the width of the damper beam section.

14. The disk drive of claim 9 wherein the damper assembly has a damper resonance frequency that is similar to the load beam resonance frequency.

15. The disk drive of claim 9 wherein the damper assembly cantilevers from the load beam.

16. The disk drive of claim 9 wherein the load beam includes a proximal end and a distal end, the proximal end being secured to the actuator arm, and wherein the damper assembly is positioned near the distal end of the load beam.

17. The disk drive of claim 9 wherein the load beam, the damper beam section and the damper mass section are formed as a unitary structure.

18. The disk drive of claim 17 wherein the load beam includes a proximal end and a distal end, the proximal end being secured to the actuator arm, and wherein the damper assembly is positioned near the distal end of the load beam.

19. The disk drive of claim 9 wherein the load beam has a longitudinal axis, the damper assembly is secured to the load beam, and the damper assembly is symmetrical to the longitudinal axis of the load beam.

20. A disk drive comprising:
a storage disk having a storage surface;
an actuator arm;
a data transducer; and
a suspension assembly for supporting the data transducer near the storage disk, the suspension assembly including (i) a load beam that couples the data transducer to the actuator arm, the load beam having a load beam resonance frequency, and (ii) a damper assembly coupled to the load beam, the damper assembly including a damper beam section, a damper mass section that extends from the damper beam section, and a resilient layer that extends between the damper mass section and the load beam, the damper mass section having a width that is different than a width of the damper beam section, the damper assembly reducing the amplitude of the load beam resonance frequency.

21. The disk drive of claim 20 wherein the damper assembly includes a cover layer that covers at least a portion of the resilient layer.

22. The disk drive of claim 20 wherein the resilient layer inhibits movement of the damper assembly in a direction that is perpendicular to the storage surface of the storage disk.

23. The disk drive of claim 20 wherein the damper assembly has a damper resonance frequency that is similar to the load beam resonance frequency.

24. The disk drive of claim 20 wherein the damper assembly cantilevers from the load beam.

25. The disk drive of claim 20 wherein the load beam, the damper beam section and the damper mass section are formed as a unitary structure.

26. The disk drive of claim 20 wherein the load beam includes a proximal end and a distal end, the proximal end being secured to the actuator arm, and wherein the damper assembly is positioned near the distal end of the load beam.

27. The disk drive of claim 20 wherein the width of the damper mass section is greater than the width of the damper beam section.

28. The disk drive of claim 20 wherein the load beam has a longitudinal axis, the damper assembly is secured to the load beam, and the damper assembly is symmetrical to the longitudinal axis of the load beam.

* * * * *

UNITED STATES PATENT AND TRADEMARK OFFICE
CERTIFICATE OF CORRECTION

PATENT NO. : 6,697,225 B2
DATED : February 24, 2004
INVENTOR(S) : Wittig et al.

It is certified that error appears in the above-identified patent and that said Letters Patent is hereby corrected as shown below:

<u>Title page,</u>
Item [56], References Cited, U.S. PATENT DOCUMENTS, please add:

| | | |
|---|---|---|
| -- 6,271,996 | 8/2001 | Houk et al. |
| 5,471,734 | 12/1995 | Hatch et al. |
| 5,208,712 | 5/1993 | Hatch et al. |
| 6,104,572 | 8/2000 | Williams et al. -- |

Signed and Sealed this

Eleventh Day of May, 2004

JON W. DUDAS
*Acting Director of the United States Patent and Trademark Office*